United States Patent [19]
Muller

[11] 3,841,680
[45] Oct. 15, 1974

[54] RESILIENT BUMPER ASSEMBLY
[75] Inventor: George H. Muller, Ann Arbor, Mich.
[73] Assignee: Ford Motor Company, Dearborn, Mich.
[22] Filed: Mar. 13, 1972
[21] Appl. No.: 234,090

[52] U.S. Cl............. 293/63, 52/100, 52/716, 293/1, 293/71 R, 293/99
[51] Int. Cl...... B60r 19/08, E04c 2/44, E04f 19/02
[58] Field of Search............ 52/222, 242, 502, 465, 52/471, 624, 627, 716, 717, 718, 100; 293/71 R, 71 P, 1, 62, 63, 98, 99

[56] References Cited
UNITED STATES PATENTS

| | | | |
|---|---|---|---|
| 2,531,967 | 11/1950 | Bishop | 293/71 R |
| 2,698,072 | 12/1954 | Beck | 52/716 X |
| 2,734,765 | 2/1956 | Henderson et al. | 293/62 |
| 2,749,171 | 6/1956 | Fergueson | 293/71 R |
| 3,290,082 | 12/1966 | Fritsch | 293/1 |
| 3,359,030 | 12/1967 | Newman | 293/1 |
| 3,441,305 | 4/1969 | Trammell, Jr. | 293/71 R X |
| 3,471,979 | 10/1969 | Herr | 52/100 |
| 3,606,432 | 9/1971 | Honatzis | 293/1 |
| 3,606,434 | 9/1971 | Barton et al. | 293/71 R X |
| 3,638,985 | 2/1972 | Barton et al. | 293/71 R |

FOREIGN PATENTS OR APPLICATIONS

| | | | |
|---|---|---|---|
| 1,249,271 | 11/1960 | France | 52/716 |
| 657,996 | 10/1951 | Great Britain | 293/71 R |

Primary Examiner—M. Henson Wood, Jr.
Assistant Examiner—Howard Beltran
Attorney, Agent, or Firm—Keith L. Zerschling; Roger E. Erickson

[57] ABSTRACT

A flexible trim strip retained in a resiliently deformable bumper member. The trim strip has a maximum transverse cross-sectional thickness through its midportion and reduced thickness at its side edges. The trim strip comprises a thin bright metal facing bonded to a flexible backing of polymeric material or the like. The metal facing is flat or plain when uninstalled or in the free state, but becomes convex about its longitudinal axis when installed in a track in the bumper member to provide an attractice highlight to the bumper asssembly.

5 Claims, 8 Drawing Figures

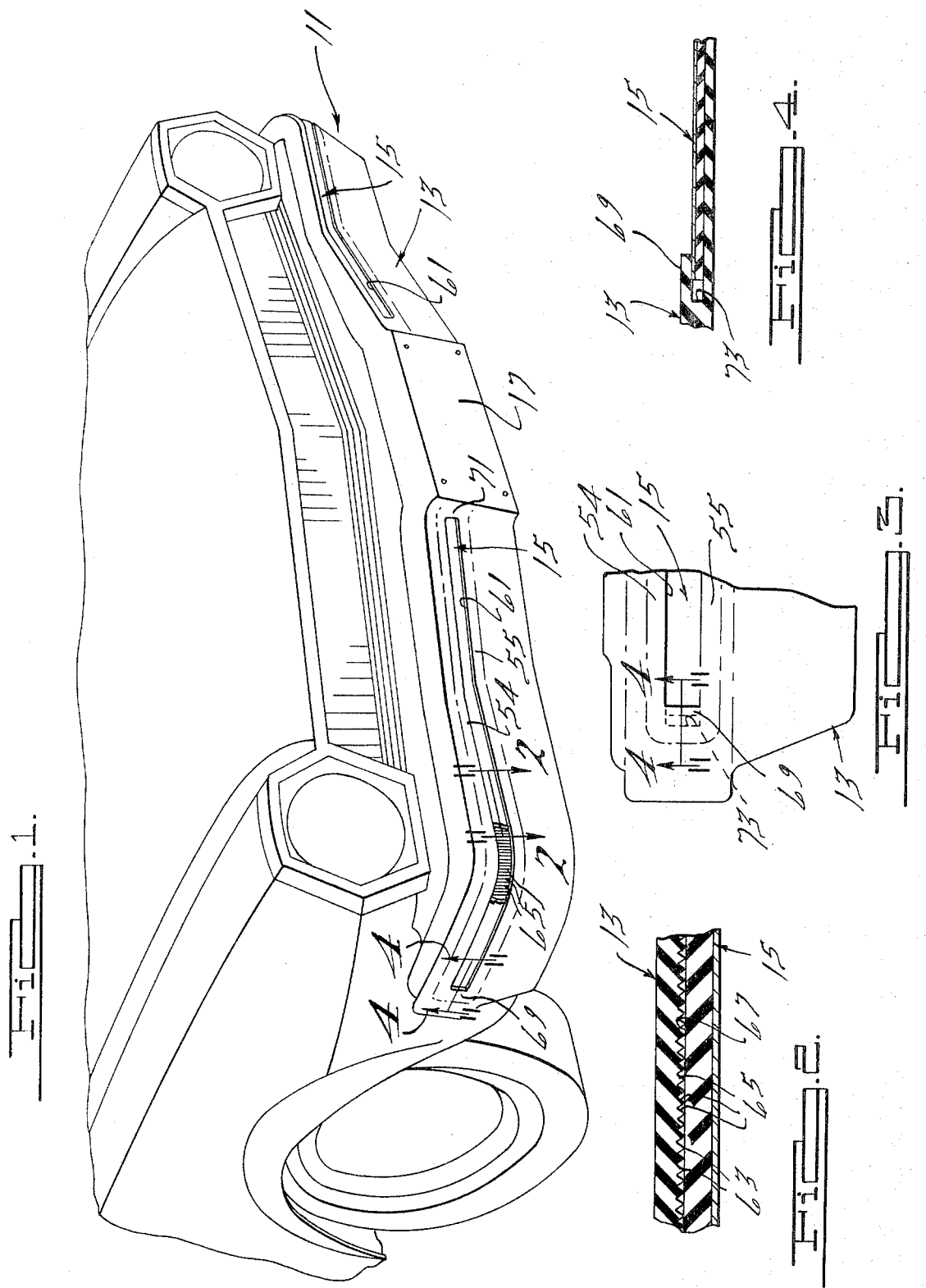

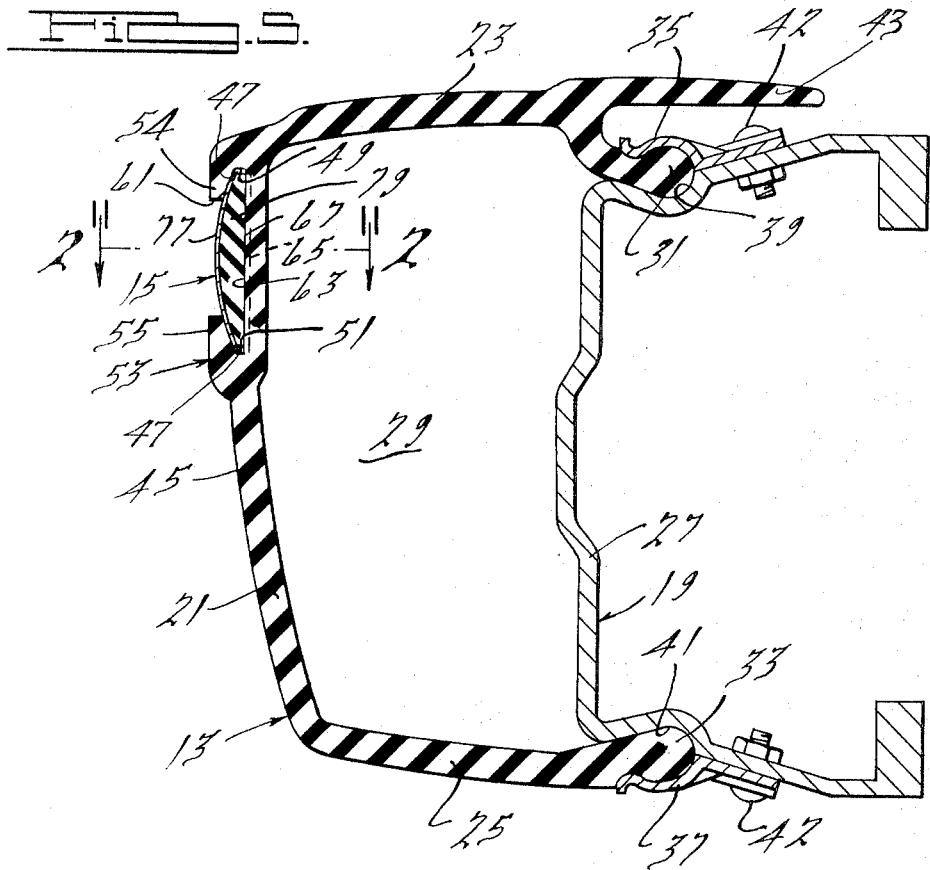

RESILIENT BUMPER ASSEMBLY

BACKGROUND AND SUMMARY OF THE INVENTION

Various resiliently deformable automobile bumper structures that yield on impact to reduce or prevent damage are known in the art. Many of these bumpers are effective in reducing impact damage to the automobile, but aesthetically are less than attractive. This invention is directed to improving the appearance of the resiliently deformable bumper member, either a pneumatic or solid type, with a bright metal trim strip. More particularly, this invention provides a trim strip retained to a deformable bumper member that prevents or substantially reduces impact damage to the trim strip. In addition, the invention provides a trim strip construction which has a flat front face when uninstalled and a crowned or convex front face when installed on the bumper member, but which does not have the buckling tendencies of precrowned metal trim strips. Furthermore, the invention provides a trim strip and retaining means which will maintain its retention during impact to the bumper and which requires no adhesives or separate mechanical fasteners. Finally, the invention provides a trim strip and retention means that is economical to produce and that provides ease of assembly and service.

A flexible trim strip and means for retaining the strip within a resiliently deformable bumper member construction in accordance with this invention and includes a track formed in the bumper member having a pair of parallel side edges and a pair of lips overlapping and enveloping the side edges. The flexible trim strip is received within the track and retained by the set of lips. The strip includes a facing of thin flat metal bonded to a flexible backing. The strip backing has a maximum transverse cross-sectional thickness through its midportion and relatively reduced transverse cross-sectional thicknesses adajcent the side edges of the trim strip. The trim strip deforms when installed within the bumper member track so that the front face of the metal strip is convex.

BRIEF DESCRIPTION OF THE DRAWINGS

FIG. 1 of the drawings is a perspective view of a front portion of an automotive vehicle showing a resiliently deformable bumper assembly incorporating this invention;

FIG. 2 of the drawings is a cross-sectional view taken along line 2—2 of FIG. 1;

FIG. 3 of the drawings is an enlarged elevational view of an end portion of the trim strip retaining means;

FIG. 4 of the drawings is a cross-sectional view taken along line 4—4 shown in FIGS. 1 and 3;

FIG. 5 is a transverse cross-sectional view of a resiliently deformable bumper assembly including the installed flexible trim strip;

FIG. 6 is a transverse cross-sectional view of the flexible trim strip shown in FIG. 4 in its uninstalled, free state;

FIG. 7 is a transverse cross-sectional view of an alternate embodiment of a flexible trim strip in its uninstalled, free state;

FIG. 8 is a transverse cross-sectional view of a portion of a resiliently deformable bumper assembly having installed the flexible trim strip of FIG. 7.

DETAILED DESCRIPTION OF THE PREFERRED EMBODIMENT

FIG. 1 of the drawings illustrates a front portion of an automotive vehicle employing a bumper assembly 11 constructed in accordance with this invention. The bumper shell 13 is constructed of a resiliently deformable material such as urethane or ethylene propylene diene monomer (EPDM). A bright trim strip 15 is mounted on the bumper shell and provides a longitudinally extending highlight to the bumper assembly. A mounting pad 17 for a license plate is centrally located on the resiliently deformable shell.

FIG. 5 of the drawings is a transverse cross-sectional view of the bumper assembly 11 taken through a portion that includes the trim strip 15. In addition to the trim strip 15 and the resiliently deformable bumper member or outer shell 13, the complete bumper assembly includes a backing member 19 onto which the resiliently deformable member or shell 13 is attached. The backing member is attached to frame or body structural members of the automotive vehicle in a conventional manner (not shown).

The resiliently deformable member or outer shell 13 includes a front wall 21, a top sidewall 23, and a bottom sidewall 25. These three walls together with the front portion 27 of the backing member 19 form a pneumatic chamber 29 which may be precharged with air pressure or which can accommodate a pressure buildup during impact. The top sidewall 23 and bottom sidewall 25 terminate at beads 31 and 33, respectively. The beads cooperate with clamps 35 and 37 and contoured portions 39 and 41 of the backing member to securely retain the resiliently deformable member 15 to the backing member 19. The clamps are fastened to the backing member by bolts 42. A flap 43 extends over top bead 31 and clamp 35 to hide the clamp and bolts from view and to present a finished, continuous appearance to the top of the resiliently deformable member.

The front face 45 of the resiliently deformable member or outer shell 13 includes a pair of tracks 47 which position and retain the flexible trim strip 15. Each track includes a pair of longitudinally extending generally parallel side edges 49 and 51. Lip means 53, including upper and lower portions 54 and 55, are integrally formed with the remainder of the resiliently deformable outer shell and overlap and envelop the track side edges 49 and 51. The inner peripheral edges of the lips 54 and 55 are substantially parallel and form the upper and lower edges of a horizontally extending opening 61 through which the flexible trim strip 15 is inserted and visible. The base 63 of the track has a friction reducing surface formation 65, which in the preferred embodiment comprises vertically disposed corrugations. It should be understood that any type of friction reducing formation is acceptable such as horizontally disposed corrugations or ribs or a plurality of conical or spherical protrusions. These friction reducing formations engage the back side 67 of the trim strip 15 and facilitates its movement relative to the track 47 during impact or during insertion. The lip means 53 includes end portions 69 and 71 which overlap longitudinal ends of the track. One of the ends is identified in FIGS. 3 and 4 by reference numeral 73. The length of the track 47 from end to end is greater than the length of the trim strip 15 providing clearance to permit longitudinal displacement of the trim strip relative to the track. If a tight pneumatic seal is not necessary, the ends of the track 47 could open into the chamber 29 rather than being closed as shown in FIG. 4.

The flexible trim strip 15 is shown installed in the resiliently deformable outer shell member 13 in FIG. 5 and is shown in its free or uninstalled condition in FIG. 6. Uninstalled the trim strip has a flat thin facing 77 of a bright material, such as polished stainless steel. As may be seen from the drawings, the facing 77 is of uniform thickness. The strip backing 79 is a flexible polymeric material to which the bright facing 77 is bonded. To provide an attractive highlight, it is desirable to have a convex surface as the visible surface of the trim strip. The convex face is achieved by varying the thickness of the backing member 79 rather than using pre-curved or precrowned thin metal material which tends to buckle rather than flatten when struck. The maximum thickness of the trim strip occurs at approximately its midpoint or midsection and a minimum thickness occurs at the upper and lower edges. When installed within the groove, as shown in FIG. 6, the track lips 54 and 55 pull the upper and lower edges of the strip toward the base 63 of the track and impart a crowned frontal surface to the metal layer.

FIGS. 7 and 8 show an alternate construction for the flexible trim strip 80 having a stepped back 81 rather than a continuously curved back. Other back configurations having a minimum thickness at the upper and lower side edges also would be suitable.

Modifications and alterations will occur to those skilled in the art which are included within the scope of the following claims:

I claim:

1. A flexible strip and means for retaining said strip to a second member comprising
    track means formed in said second member having a pair of substantially parallel side edges and lip means overlapping and enveloping said side edges,
    said flexible strip received in said track and retained therein by said lip means,
    said flexible strip received in said track and retained therein by said lip means,
    said flexible strip having a maximum transverse cross sectional thickness through an intermediate section and a reduced cross section thickness adjacent the side edges thereof,
    said flexible strip having a substantially flat front face when uninstalled and having a convex front face when installed in said track means, said convex front face being curved about an axis extending in the longitudinal direction of the flexible strip.

2. A flexible strip and means for retaining said strip to a second member according to claim 1,
    said flexible strip comprising a thin metallic layer of substantially uniform thickness bonded to a resiliently deformable backing,
    a surface of said metallic layer comprising the front face of said strip when installed in said second member.

3. A flexible trim strip and means for retaining said strip to a resiliently deformable bumper member comprising
    track means formed in said bumper member having a pair of longitudinally extending substantially parallel side edges and lip means overlapping and enveloping said side edges, said track means including a base positioned between said side edges and partially enclosed by said lip means,
    a flexible trim strip being receivable within said track means and having a pair of longitudinally extending generally parallel side edges,
    said trim strip having a maximum transverse cross sectional thickness through its midsection between its longitudinally extending side edges and reduced transverse cross sectional thicknesses at its portions adjacent the side edges of the trim strip,
    said trim strip in an uninstalled free state having a generally flat front face,
    said trim strip when installed within said track means being deformed to have a generally convex front face curved about a longitudinal axis of said trim strip.

4. A flexible trim strip and means for retaining said strip to a resiliently deformable bumper member according to claim 3,
    said flexible trim strip comprising a thin metallic layer of generally uniform thickness bonded to a resiliently deformable backing,
    a surface of said metallic layer comprising the front face of said trim strip when installed in said bumper member.

5. A flexible strip and means for retaining said strip to a second member comprising
    track means formed in said second member having a pair of substantially parallel side edges and lip means overlapping and enveloping said side edges,
    said flexible strip received in said track and retained therein by said lip means,
    said flexible strip having a maximum transverse cross sectional thickness through its midsection and reduced cross sectional thicknesses as the side edges thereof are approached,
    said flexible strip having a substantially flat front face when uninstalled and having a convex front face when installed in said track means, said convex front face being curved about an axis extending in the longitudinal direction of the flexible strip.

* * * * *